(12) United States Patent
Silvas et al.

(10) Patent No.: US 6,318,926 B1
(45) Date of Patent: Nov. 20, 2001

(54) PIVOT BEARING PROVIDED ON SUPPORT STRUCTURES FORMED OF SHAPED BARS

(75) Inventors: David Silvas, Wylie; Daniel Beall, Allen; Richard Schulze, Plano, all of TX (US)

(73) Assignee: EOA Systems Incorporated, Dallas, TX (US)

( * ) Notice: Subject to any disclaimer, the term of this patent is extended or adjusted under 35 U.S.C. 154(b) by 0 days.

(21) Appl. No.: 09/501,878

(22) Filed: Feb. 10, 2000

(51) Int. Cl.[7] ................. B25G 3/00; F16B 3/00; F16D 1/00
(52) U.S. Cl. ........................ 403/345; 403/359.6
(58) Field of Search .................. 403/345, 365, 403/366, 367, 368, 359.6, 26

(56) References Cited

U.S. PATENT DOCUMENTS

| | | | |
|---|---|---|---|
| 3,147,829 | * 9/1964 | Johnson et al. | 189/26 |
| 3,645,569 | * 2/1972 | Reilly | 287/54 A |
| 4,032,245 | 6/1977 | Woodruff | 403/385 |
| 5,667,332 | * 9/1997 | Lindholm | 403/359 |
| 5,797,696 | * 8/1998 | Baynes et al. | 403/377 |

FOREIGN PATENT DOCUMENTS 2 275 737   9/1994 (GB).

* cited by examiner

*Primary Examiner*—Lynne H. Browne
*Assistant Examiner*—John B Walsh
(74) *Attorney, Agent, or Firm*—Collard & Roe, P.C.

(57) ABSTRACT

A pivot bearing comprises a shaped bar having an outer circumferential surface provided with two oppositely arranged, longitudinally extending notches, and a sleeve arranged on the shaped bar and having an externally cylindrical surface and an inner circumferential surface facing the outer circumferential surface of the shaped bar and provided with two oppositely arranged longitudinally extending notches. The longitudinally extending notches of the shaped bar are in alignment with the longitudinally extending notches of the sleeve to form two pairs of notches, and cylindrical pins are arranged in the two pairs of notches.

8 Claims, 3 Drawing Sheets

PIVOT BEARING PROVIDED ON SUPPORT STRUCTURES FORMED OF SHAPED BARS

BACKGROUND OF THE INVENTION

1. Field of the Invention

The present invention is related to a pivot bearing provided on support structures formed of shaped bars, which, in particular, is secured to and moved by robot arms, and which is used for attaching tools, such as clamping, suction, gripping equipment and/or the like tools.

2. Description of the Prior Art

Shaped bars of the afore-described type are used for assembling support structures which, in turn, are especially intended for attachment to robot arms and for securing tools such as clamping, suction and gripping equipment and/or other working equipment.

The shaped bars intended for the afore-described purposes that are interconnected by corresponding clamping elements correspondingly conforming in profile, as a rule, are profiles of octagonal configuration which, in turn, are normally provided with not less than two radially opposite notches. Bars of octagonal profiles are preferably used for the afore-mentioned purposes to enable the clamping elements of conforming profiles to be mounted in eight different orientations to the shaped bars, depending on the orientation in which the tools referred to in the afore-going by way of example, are to be seated on the support structure, and, furthermore, depending on the orientation intended for crossing shaped bars held by the same clamping element. No direct and stepless adjustment of orientation of tools of the afore-described type relative to shaped bars of polygonal configuration of the afore-mentioned type, through a clamping element, hitherto, has been possible so that a special configuration of the clamping elements has been required to the effect that they had to be combined with a pair of turntables in the event that a stepless displacement was desired, with such a procedure involving substantial efforts.

For further details regarding special clamping elements adapted to be mounted to shaped bars, reference is made to U.S. Pat. No. 4,032,245.

However, UK Patent Application GB 2 275 737 A also teaches support structures of this type wherein the support bars are made of cylindrical sectional tubes. As the shaped bars irrespective of whether they are of a cylindrical or polygonal configuration, are of drawn material, inevitable inaccuracies will occur which are likely to result in inaccuracies of adjustment of attached tools of the afore-mentioned type. Moreover, it is not possible to safeguard a torque-resistant seat in all radial orientations by clamping alone.

OBJECTS AND SUMMARY OF THE INVENTION

It is, therefore, a primary object of the present invention to provide a new and improved pivot bearing on shaped bars of this type that can be precisely centered relative to the longitudinal axis of the shaped bars in an easy way and by simple means.

Another object of the present invention is to provide a pivot bearing which can be mounted in a torque-resistant way on the respective sectional bar.

An additional object of the present invention is to provide a pivot bearing that can be mounted to the sectional bar concerned.

A still further object of the present invention is to provide a pivot bearing which is so dimensioned that an item to be attached thereto also in the axial direction can be adjusted and fixed.

The afore-going and other objects are attained in accordance with one aspect of the present invention through the provision of a pivot bearing which comprises a sleeve at least externally of a cylindrical configuration which on the inner circumferential face thereof is provided with two diametrically opposed notches and at least two notches arranged diametrically opposite the outer circumferential face of the sectional bar concerned which are in alignment with the notches of the sleeve, with cylindrical pins in abutment with the faces of the notches being arranged in the pairs of notches.

The term "pivot bearing" in the present context, obviously, does, not refer to an element about which another element is to permanently rotate; it rather means an internal stationary bearing for an element to be mounted thereon which can be fixed to the said "pivot bearing" in any desired radial position.

Accordingly, with the sleeve at least externally of a cylindrical configuration, a torque-resistant pivot bearing is associated to the respective sectional bar, at the desired point of attachment, to which is then directly pushed a corresponding inner cylindrical adapter which can be steplessly fixed in any desired radial orientation to the sleeve or to the pivot bearing of the present invention yet to be explained in greater detail hereinafter.

The tool desired to be attached at this point can be suitably fixed to such an adapter.

As such support clamps carried by robot arms and being movable in all directions require the best possible accuracy of position for the tools attached thereto, also the sleeve must be precisely centered relative to the longitudinal axis of the sectional bar; this centering requirement is complied with, in a simple way, by the notches of the invention and the cylindrical pins. The said pins not only insure torque-resistance of the sleeve but especially also an accurate centering of the sleeve relative to the axis of the sectional bar. As, in addition, sectional bars of this type for the afore-described purpose of providing robot-supported and robot-moved supports, as a rule, and, in particular, in polygonal cross-sections, are also provided, as mentioned before, with not less than two groves of the type suggested by the present invention, an advantageous embodiment of the pivot bearing resides in that the sleeve is provided with two radially inward bridges arranged radially opposite and fitting in grooves of the sectional bars and being in engagement therewith, with the grooves and bridges being arranged in staggered relationship to the pairs of notches. Accordingly, in this form of embodiment, it is especially the bridges of the sleeve that contribute, with advantgage, to the torque resistance.

BRIEF DESCRIPTION OF THE DRAWINGS various objects, features and attendant advantages of the present invention will be more fully appreciated as the same becomes better understood from the following detailed description thereof when considered in connection with the accompanying drawings, in which.

DETAILED DESCRIPTION OF THE PREFERRED EMBODIMENTS

Figure 1:
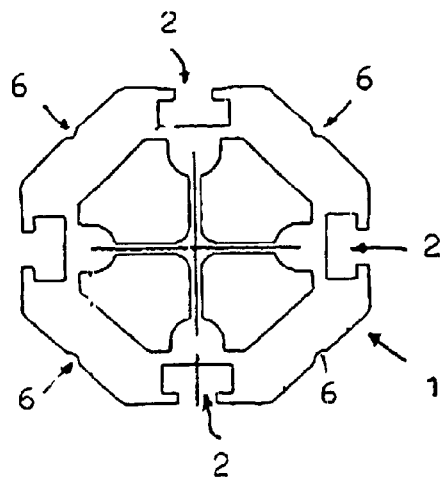
FIG. 1 is a sectional view of a shaped bar of octagonal configuration having four notches.
Figure 2:
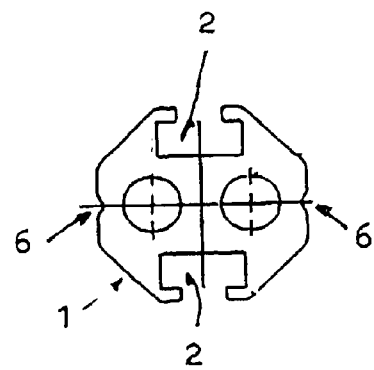
FIG. 2 is a sectional view of a shaped bar of octagonal configuration having two notches.
Figure 9:
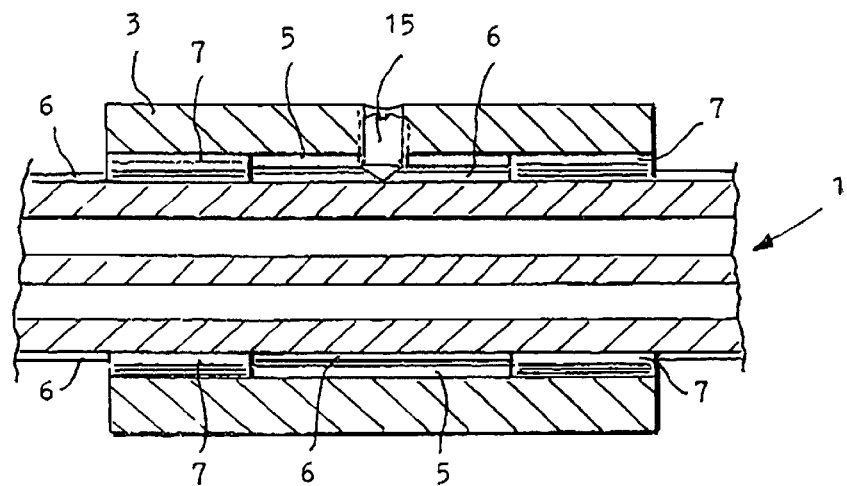
FIG. 9 is a sectional view of the pivot bearing taken along the line IX—IX in FIG. 5.
Figure 10:
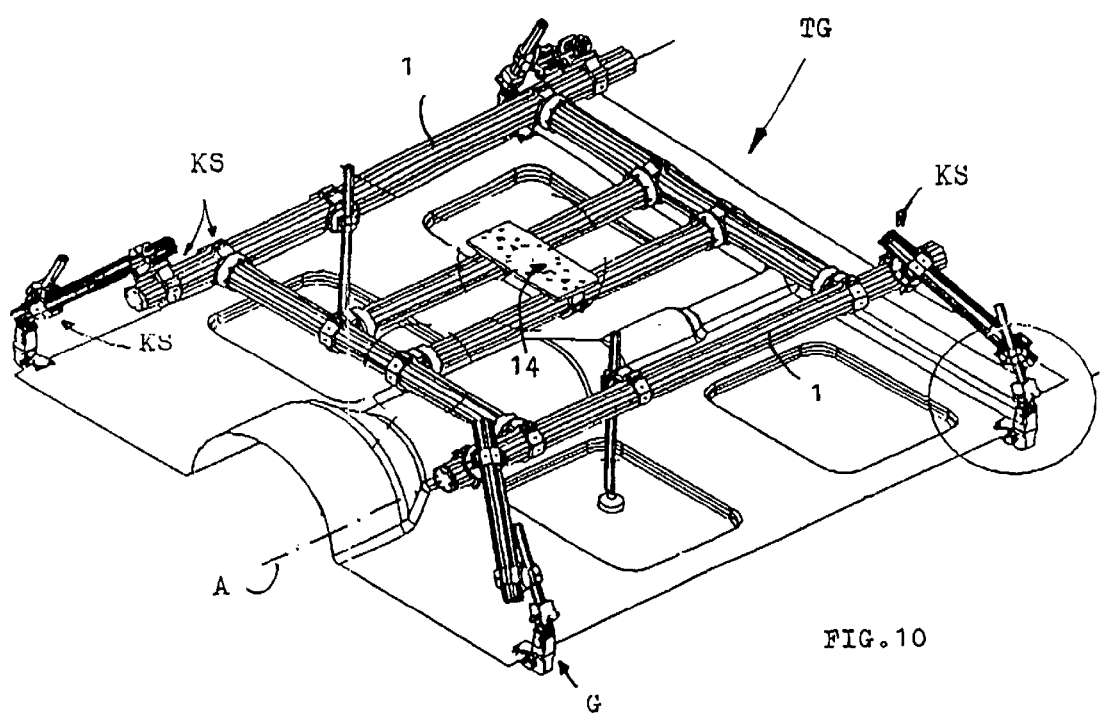
FIG. 10 is a perspective view of a form of embodiment of a support structure for supporting and transporting a car body sheet.

FIGS. 1, 2 are sectional views of typical shaped bars 1 of octagonal configuration of the type as used for the assembly of support structures arranged on robot arms. A support structure of this type is shown in FIG. 10, wherein the sectional bars 1 are interconnected by so-called clamping members KS which do not require any special description as they are known in the art and are of no particular interest in the present context. Reference is only made to the fact that the bar connectors shown in FIG. 9 are the combination of the clamping members and turntables referred to in the introductory part by way of which grippers G as shown cannot be directly adjusted in a steplessly rotating way to the axes A of the shaped bars 1.

The shaped bars 1 sectionally shown in FIGS. 1,2 are profiles octagonal in cross-section essentially distinguished only by their cross-sectional size and the number of their grooves 2. Under consideration of the overall stability and rigidity, respectively, of such support structures formed of shaped bars, the shaped bars are of a relatively thick wall strength, as shown, for example, relative to the respective diameter.

Figure 3:
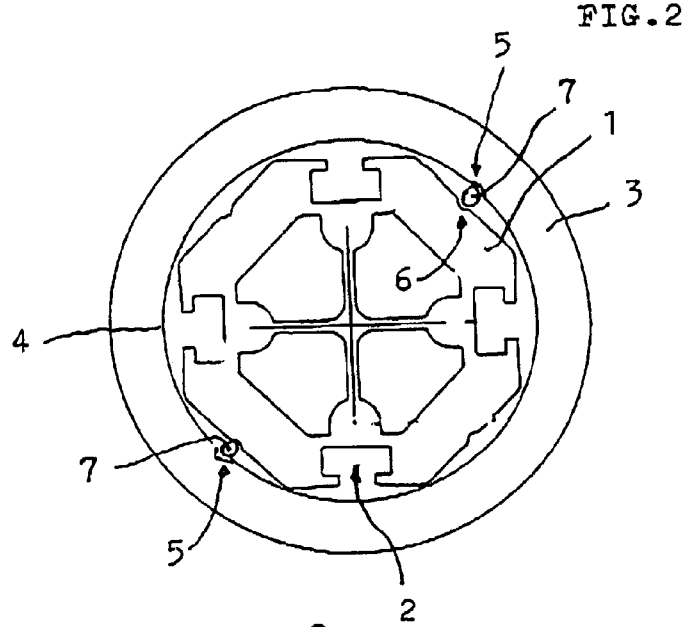
FIG. 3 is a sectional view of a shaped bar with the pivot bearing centered thereon.

The pivot bearing of the present invention to be formed of such shaped bars 1, in reference to FIG. 3, substantially comprises a sleeve 3 at least externally of a cylindrical configuration and, on their internal circumferential face 4, being provided with two diametrically opposite notches 5, with at least two corresponding notches 6 being arranged diametrically opposite the outer circumferential face of the respectively shaped bar 1, which notches 6 are in alignment with the notches 5 of the sleeve 3. Arranged within the so formed pairs of notches 5,6, in the practice of the invention, are cylindrical pins 7 in abutment with the faces 5', 6' of the notches 5,6.

Figure 8:
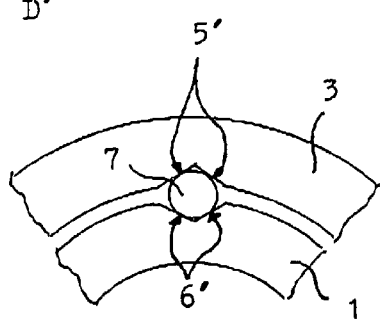
FIG. 8 is a sectional view on an enlarged scale of the mounting area of a pair of notches.

Concerning the association of pins 7 to notches 5,6 reference is made to the highly schematized illustration of FIG. 8. Pins 7 in conjunction with notches 5,6 triangular in cross-section serve both for centering the sleeve 3 precisely to axis A of shaped bar 1 and, at the same time, for the torque-resistance of sleeve 3 vis-à-vis shaped bar 1.

Figure 4:
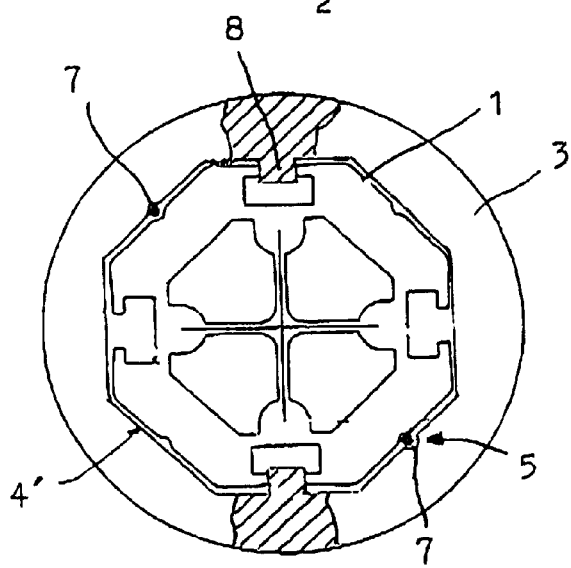
FIG. 4 is a corresponding sectional view of another form of embodiment according to FIG. 5 is a perspective view of a shaped rod along with the pivot bearing of the invention and an adapter secured thereto.

As shaped bars of the type as set out in FIGS. 1, 2 are preferably used for the present purposes, as previously mentioned, which are therefore provided with grooves 3, an advantageous development according to FIG. 4 resides in that the sleeve 3 forming the pivot bearing of the invention is provided with two radially inwardly extending, radially opposing bridges 8 fitting in grooves 2 of the shaped bar, with the grooves 2 and the bridges 8 being arranged in staggered relationship to the pairs of notches 5,6. Accordingly, the torque-resistance is insured, in particular, by the bridges 8 engaging the grooves 2, i.e. the notches and the fitting pins 7 in that case can be smaller dimensioned than in the form of embodiment according to FIG. 3.

FIG. 4 also shows a form of embodiment in which sleeve 3 of the invention with the inner face 4' thereof substantially conforms to the polygonal cross-sectional configuration of the shaped bar 1.

Figure 5:
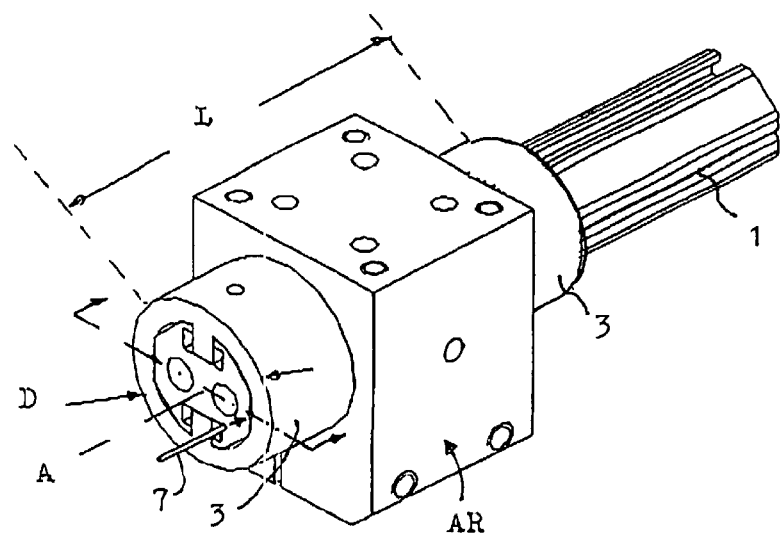

FIG. 5 is a perspective view of the arrangement of the pivot bearing and of the sleeve 3, respectively, seated on a shaped bar 1, at the same time showing an adapter AR fixed in clamping relationship on the sleeve 3, to which adapter a tool may then be attached. Accordingly, an adapter AR of this type can be fixed in any desired position to the sleeve 3. The length L of the sleeve 3, preferably, corresponds at least to twice its diameter in order to enable such an adapter AR also to be differently positioned in the axial direction.

Figure 6:
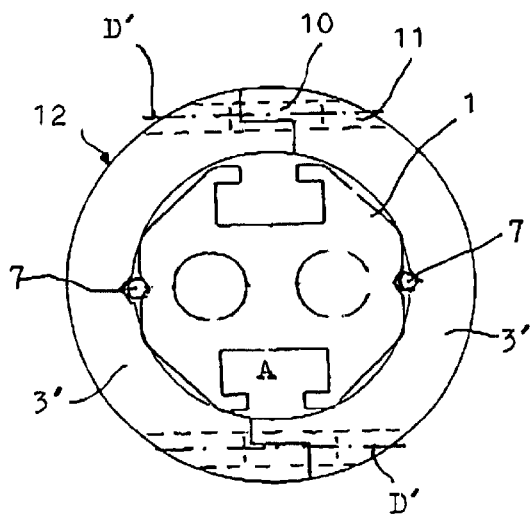
FIG. 6 is a sectional view of another form of embodiment of the pivot bearing, for example, in connection with a shaped bar according to FIG. 2.

FIG. 6 shows a special form of embodiment of the sleeve 3 inasmuch as it is formed of two identical cup halves 3' which, as illustrated, may be crossed or shanked at the butt edges thereof, where they can also be screwed in the area of conjugated diameters D' but means of nuts 10 only shown in broken lines. The heads of nuts 10 must, of course, be housed in bores 11, i.e. the latter are not allowed to protrude beyond the outer circumferential face 12 of the sleeve 3.

Figure 7:
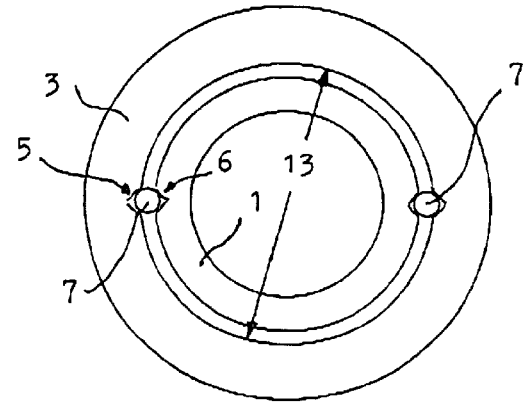
FIG. 7 is a sectional view of the pivot bearing in connection with a tube of circular cross-section forming the shaped rod.

FIG. 7 shows another form of embodiment of the invention in which the shaped bar 1 is a cylindrical tube to which the sleeve 3 is to be associated in a precisely centered way despite the internal oversize 13 which, also in this form of embodiment, is completed by forcing or pushing the two cylindrical pins 7 into the pairs of notches 5,6 also provided herein. The oversize 13 referred to above which may be in the order of 1 to 2 mm, obviously, also exists between bar 1 and sleeve 3 of the other forms of embodiment.

FIG. 9 discloses a sectional view taken along the line IX—IX in FIG. 5 of the pivot bearing, showing that the notches 5,6 extend both along the sleeve 3 and along the bar 1 across the entire length thereof. In order to prevent the pins 7 from being folded up by a length corresponding to the length L of the sleeve 3, within the pairs of notches with a slight press fit, the pins 7 relative to the length of the notches 5, in sleeve 3, are shorter dimensioned and are pushed from both sides into the pairs of notches. Moreover, an additional axial attachment of the sleeve 3 to the shaped bar 1 can be insured by a countersunk screw 15 as equally shown by FIG. 9.

As set out in the introductory part of the description, FIG. 10 shows shaped bars 1 joined together by means of clamping members KS forming a support structure TG carried by a robot arm not shown in any detail, to which is attached the support structure TG by means of a centrally arranged connecting plate 14. As this constitutes but an example for a support structure TG, no pivot bearings of the type provided by the invention, are shown thereon.

Obviously, numerous modifications and variations of the present invention are possible in the light of the above teachings. It is, therefore, to be understood that within the scope of the appended Claims, the invention may be practiced otherwise than as specifically described therein.

What is claimed is:

1. A pivot bearing comprising
   (a) a shaped bar having an outer circumferential surface provided with two oppositely arranged, longitudinally extending notches, (b) a sleeve arranged on the shaped bar and having
  (1) an externally cylindrical surface and
  (2) an inner circumferential surface facing the outer circumferential surface of the shaped bar and provided with two oppositely arranged longitudinally extending notches,
  (3) the longitudinally extending notches of the shaped bar being in alignment with the longitudinally extending notches of the sleeve to form two pairs of notches, and
(c) cylindrical pins in abutment with the faces of the notches arranged in the two pairs of notches.

2. The pivot bearing of claim 1, wherein pins shorter in length than the notches are arranged at respective ends of the pairs of notches.

3. The pivot bearing of claim 1, further comprising at least one screw countersunk in the sleeve fixes the sleeve and the shaped bar against axial displacement relative to each other.

4. The pivot bearing of claim 1, wherein the outer circumferential surface of the shaped bar and the inner circumferential surface of the sleeve correspond to each other in cross section.

5. The pivot bearing of claim 1, wherein the sleeve has a length corresponding to at least twice the outer diameter thereof.

6. A pivot bearing comprising
(a) a shaped bar having an outer circumferential surface provided with two oppositely arranged longitudinally extending notches extending along the entire length thereof,
(b) a sleeve arranged on the shaped bar and having
  (1) an externally cylindrical surface and
  (2) an inner circumferential surface facing the outer circumferential surface of the shaped bar and provided with two oppositely arranged longitudinally extending notches extending along the entire length thereof,
  (3) the longitudinally extending notches of the shaped bar being in alignment with the longitudinally extending notches of the sleeve to form two pairs of notches, and
(c) cylindrical pins in abutment with the faces of the notches arranged in the two pairs of notches.

7. A pivot bearing comprising
(a) a shaped bar having an axis and an outer circumferential surface provided with two oppositely arranged, longitudinally extending notches,
(b) a sleeve arranged on the shaped bar, the sleeve being comprised of two cup halves and the cup halves being screwed together at conjugated diameters equidistantly from the axis of the shaped bar, and the sleeve having
  (1) an externally cylindrical surface and
  (2) an inner circumferential surface facing the outer circumferential surface of the shaped bar and provided with two oppositely arranged longitudinally extending notches,
  (3) the longitudinally extending notches of the shaped bar being in alignment with the longitudinally extending notches of the sleeve to form two pairs of notches, and
(c) cylindrical pins in abutment with the faces of the notches arranged in the two pairs of notches.

8. A pivot bearing comprising
(a) a shaped bar having an outer circumferential surface provided with two oppositely arranged, longitudinally extending notches,
(b) a sleeve arranged on the shaped bar and having
  (1) an externally cylindrical surface and
  (2) an inner circumferential surface facing the outer circumferential surface of the shaped bar and provided with two oppositely arranged longitudinally extending notches,
  (3) the longitudinally extending notches of the shaped bar being in alignment with the longitudinally extending notches of the sleeve to form two pairs of notches, and
  (4) the sleeve being provided with two oppositely arranged, radially inwardly projecting bridges fitting into grooves in the outer circumferential surface of the shaped bar, the bridges and grooves being circumferentially staggered from the pairs of notches, and
(c) cylindrical pins in abutment with the faces of the notches arranged in the two pairs of notches.

\* \* \* \* \*